Figure 1:
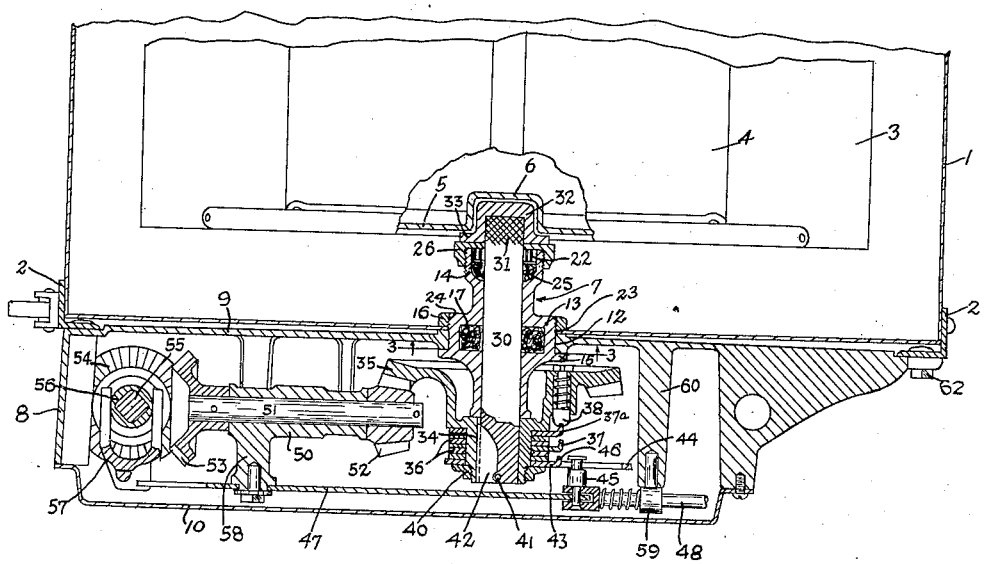

Dec. 20, 1927.

W. A. FRANTZ 1,653,266

OPERATING MECHANISM

Filed Sept. 24, 1923

Walter A. Frantz INVENTOR.

BY

Smith and Freeman ATTORNEY.

Patented Dec. 20, 1927.

1,653,266

UNITED STATES PATENT OFFICE.

WALTER A. FRANTZ, OF CLEVELAND HEIGHTS, OHIO, ASSIGNOR TO THE APEX ELECTRICAL MANUFACTURING COMPANY, OF CLEVELAND, OHIO, A CORPORATION OF OHIO.

OPERATING MECHANISM.

Application filed September 24, 1923. Serial No. 664,338.

My invention relates to washing machines and the principal object of my invention is the provision of new and improved operating mechanism peculiarly suitable for the operation of such machines and among other things so arranged that the main shaft of the machine may be journaled in the side of the casing below the water level without leakage of the washing fluid from the casing or of the lubricant into the casing, so arranged that the entire operating mechanism may be assembled as a unit remote from the washing machine and then applied to the washing machine as such a unit, and so arranged that the reversal of the operating shaft is automatically omitted under certain abnormal conditions.

In the drawings accompanying this specification and forming a part thereof I have shown, for purposes of illustration, one physical form in which my inventive idea may be embodied and have selected for this purpose an embodiment which is an improvement upon the structure illustrated in the Letters Patent of William V. Orr, No. 1,507,416, issued September 2, 1924.

Figure 2:
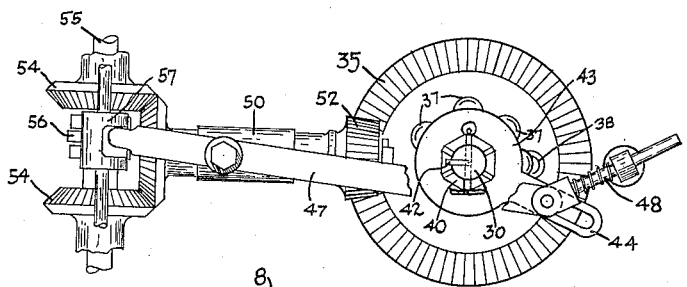
Figure 3:
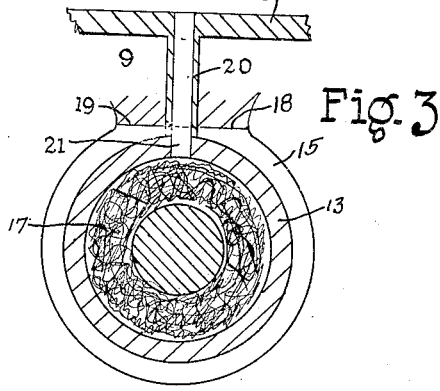

In these drawings:

Figure 1 is a horizontal sectional view through the center of the gear box and its mechanism, Figure 2 is a front elevation of the mechanism shown in Figure 1, and Figure 3 is a detail section taken on the line 3—3 of Figure 1.

The device herein illustrated comprises a washing machine provided with a casing 1 which is supported by suitable legs 2 and encloses a washing device 3 herein shown as a horizontal cylinder adapted to receive the clothes through a removable door 4 and provided with a disc end 5 having at its center a prismatic socket 6.

Secured exteriorly of the casing 1 in any suitable manner as by bolting to the legs 2 is a gear box 8 having a back 9 adjacent the wall of the casing 1 and having an open front adapted to be closed by a removable cover 10. The back 9 is formed opposite the socket 6 with an aperture 12 registering with a similar aperture 23 in the casing 1 and mounted therein is a bearing 7 which consists of a hollow metal casting provided at its inner end with an enlargement 14 and centrally with a second enlargement 13 spaced from the first enlargement. The exterior of the enlargement 13 is formed to fit into the apertures 12 and 23 and is provided on one side with a flange 15 adapted to overlap the back 9 adjacent thereto and at the other side with a threaded portion 24 adapted to receive a nut 16 arranged to cooperate with the shoulder 15 to grip the back 9 and casing 1 therebetween and thus secure the bearing in position. Interiorly the enlargement 13 is chambered for the reception of suitable packing 17 while one edge of the flange 15 is preferably flattened as shown at 18 to engage a suitable abutment 19 to prevent turning of the bearing when the nut 16 is tightened. A short oil duct 20 is shown as cast into the back 9 of the gear box and leading from one of the walls 8 to a port 21 formed in the bearing 7. The enlargement 14 is also chambered for the reception of packing 25 and a spring 22, preferably of convolute form, is inserted therein and secured in position by a nut 26 which is preferably smaller than the apertures 12 and 23 to permit insertion of the assembled device into the casing 1.

The bearing 7 rotatably supports an operating shaft 30 the inner end of which is preferably roughened as shown at 31 and provided with a square aluminum head 32 cast thereon, formed to fit loosely within the socket 6, and preferably provided at its lower end with a flange 33 adapted to limit the insertion of the head and also to overlie closely the face of the nut 26. Owing to its considerable shrinkage in setting, cast aluminum is particularly satisfactory for the head 32 since it grips the shaft so rigidly as to be proof against dislodgment and in addition possesses a very low melting point, is substantially unaffected by washing fluids, and materially shields the shaft 30 and nut 26 from corrosion by galvanic action.

To the outer end of the shaft 30 is rigidly secured a driving member herein shown as a bevel gear 35 the hub 34 of which is shown as reduced exteriorly for the reception of metal discs 36 each of which is provided with a finger 37 overlying the adjacent disc except that the finger 37ª of the first disc in the series is arranged to engage a spring pressed plunger 38 carried in the hub 34. The discs 36 are held in place by a suitable nut 40 itself held in place by a cotter pin 41 which also assists in holding in place the key 42 which splines the hub 34 to the shaft 30. Surrounding the shaft 30 adjacent to the last of the discs 36 is a collar 43 having at one side a radial arm 44 formed with a finger 46 adapted to engage the finger of the adjacent last disc and slotted for the reception of a sliding pin 45 which constitutes the middle point of a toggle one arm of which consists of a lever 47 and the other of which consists of a pivoted spring pressed pin 48 slidably mounted in a pivoted eye 59 carried by a post 60.

Located inside the box perpendicular to the shaft 30 is a bearing 50 carrying a countershaft 51 provided at one end with a bevel gear 52 meshing with the bevel gear 35 carried by the operating shaft 30 and at the other end with a bevel gear 53 meshing with the bevel gears 54 separately loosely sleeved on a power shaft 55. Splined on the power shaft 55 between the gears 54 is a clutch spool 56 engaged by a yoke 57 movable longitudinally of the shaft 55 to connect either of the gears 54 thereto and actuated by the end of the lever 47 which is herein shown as pivoted to a post 58 carried by the bearing 50.

It will be understood from the above description that with the clutch spool in one position the corresponding gear 54 will be connected to the power shaft 55 to drive the cooperating gear 53 in one direction and through the gear 53 operate in the same direction the intermediate shaft 51, gear 52, gear 35, operating shaft 30, and head 32, to thereby rotate in that direction the washing device 3. It will also be understood that as this rotation continues the spring plunger 38 carried by the gear 35 engages and rotates the first finger 37ª of the first disc 36 which thereupon engages the finger 37 of the next disc 36 which action continues until all of the discs 36 are rotating with the shaft 30 whereupon further rotation of the shaft 30 causes rotation of the collar 43 and arm 44 to swing the pin 45 and in this manner shift the lever 47 to move the collar 56 longitudinally of the shaft 55 to disengage from the shaft 55 the gear 54 then connected thereto and engage with the shaft 55 the other gear 54 to thus cause rotation of all of the parts in the reverse direction until finally the collar 43 and arm 44 and pin 45 are again actuated to again reverse the rotation. It will also be understood that under abnormal conditions the pin 38 may yield to permit the machine to continue operating without reversing. It will further be apparent from the above disclosure that the entire operating device herein shown may be assembled from a point removed from the washing machine and then inserted into the washing machine as a unit and secured into position merely by applying the nut 16 and that after such insertion leakage between the bearing and the interior of the casing 1 is impossible.

It will be obvious to those skilled in the art that the device herein shown provides many advantages over the devices now in use or heretofore suggested. It will also be apparent, however, that the device described herein may be variously changed and modified without departing from the spirit of my invention or sacrificing the advantages thereof. It will therefore be obvious that the disclosure herein is illustrative only and my invention not limited thereto.

I claim:

1. In a washing machine, a casing for washing liquid having an aperture in one of its walls, a gear box secured to the exterior of said casing, a bearing member projecting from the wall of said gear box and traversing said aperture, said member terminating at its inner end in an enlargement arranged to receive packing therewithin, a gland nut secured to said member and overlapping the open end of said enlargement, a shaft journaled in said bearing, an enlarged driving head carried by said shaft and closely overlying said gland nut, gearing in said box for oscillating said shaft, and an oscillatory driven member located in said casing, said head and driven member having interfitting portions whereby driving power is transmitted and the aperture in said casing being of greater diameter than either said head or nut, and a clamping ring surrounding said bearing member and engaging the wall of said casing adjacent to said aperture in leak preventing relation.

2. In a washing machine, a casing for washing liquid having an aperture in one of its walls, a gear box secured to the exterior of said casing, and having in its wall an aperture registering with said casing aperture, a bearing member traversing both apertures and having at one side a shoulder and at the other side a clamping ring between which are located both of said walls, said member terminating at its inner end in a hollow enlargement, a shaft journaled in said bearing, packing in said enlargement, a gland nut for said packing, gearing in said box for oscillating said shaft, an enlargement head carried by said shaft, and an oscillatory driven member located in said casing, said head and driven member having interfitting driving connections, said apertures being larger than either said head or said gland nut to permit the introduction of said parts into the casing after the assembling of said gearing and said bearing-member being formed beyond said first enlargement with a second enlargement of a size to fit said apertures.

In testimony whereof, I hereunto affix my signature.

WALTER A. FRANTZ.